United States Patent [19]

Kudo et al.

[11] Patent Number: 5,170,015
[45] Date of Patent: Dec. 8, 1992

[54] WIRE CONDUCTORS FOR AUTOMOBILES

[75] Inventors: Kazunao Kudo; Kazuo Yamazaki, both of Hyogo; Fukuma Sakamoto, Osaka; Kazunori Tsuji, Mie, all of Japan

[73] Assignees: Sumitomo Electric Industries, Ltd., Osaka; Sumitomo Wiring Systems, Ltd., Mie, both of Japan

[21] Appl. No.: 724,912

[22] Filed: Jul. 2, 1991

[30] Foreign Application Priority Data

Jul. 2, 1990 [JP] Japan .................................. 2-176083

[51] Int. Cl.$^5$ ........................... H01B 5/08; H01B 1/02
[52] U.S. Cl. .............................. 174/128.1; 174/119 P.; 174/126.1; 174/126.2
[58] Field of Search .................. 174/119, 126.1, 126.2, 174/128.1; 428/618, 677

[56] References Cited

U.S. PATENT DOCUMENTS

| | | | |
|---|---|---|---|
| 2,036,667 | 4/1936 | Williams | 174/126.2 |
| 2,134,014 | 10/1938 | Whitehead | 174/126.2 |
| 2,268,617 | 1/1942 | Pierce | 174/126.2 |
| 2,317,350 | 4/1943 | Adler et al. | 428/677 |
| 3,490,125 | 1/1970 | Frieling, Jr. | 428/592 |
| 4,810,593 | 3/1989 | Yamamoto et al. | 428/677 |

*Primary Examiner*—Morris H. Nimmo
*Attorney, Agent, or Firm*—Wenderoth, Lind & Ponack

[57] ABSTRACT

An electric wire conductor for use in automobiles made by twisting together a plurality of strands. Each of the strands has a surface layer made of copper or a copper alloy and a core made of steel containing 0.05–0.85 percent of carbon and other elements such as Si, Mn, Ni, Cr, Mo, Nb, V, B, Be, Al, or Ti and P, S and Cu. Each strand has a tensile strength of 80–160 kgf/mm$^2$ before being twisted and a conductivity of 25% IACS or more. The conductor has a total sectional area of 0.05–0.30 mm$^2$, a breaking load of more than 6 kgf, and an elongation at break not less than 2%.

4 Claims, 2 Drawing Sheets

WIRE CONDUCTORS FOR AUTOMOBILES

This invention relates to a lightweight electric wire conductor for automobiles.

As an electric wire conductor used for wiring in automobiles, wires made by twisting wires made of annealed copper (under JIS C 3102) or those plated with tin have heretofore been used. The wires are then covered with an insulating material such as vinyl chloride, crosslinked vinyl or crosslinked polyethylene.

Modern cars have an increasing number of control circuits to achieve high performance and as a result the number of wiring points is increasing. This has led to an ever increasing demand for lighter wires while maintaining high reliability. Thus, the above-described conventional wire conductors are rapidly losing popularity.

Although most of electric wires for control circuits have a permissible current of 1 ampere or less since they are used merely to pass signal currents, it was heretofore necessary to use wires having a larger diameter than electrically necessary in order to assure their mechanical strength.

As one solution for achieving lightness in weight of such wires, consideration was given to the use of aluminum (including its alloy; all references to aluminum should be so understood hereinafter) as a material for the conductors. Also, wires made of copper alloy containing 0.3-0.9 percent of tin and ones made of phosphor bronze containing 4-8 percent of tin have been developed (Japanese Patent Examined Publications 60-30043 and 61-29133) and are now in actual use.

Also, a wire conductor having a tensile strength of 90-140 kgf/mm$^2$ and a load at break of 6 kgf or more has been developed.

Since aluminum is poor in strength, the wires made of aluminum have to have an increased outer diameter or have to consist of an increased number of strands to be twisted together in order to assure a sufficient strength. This will lead to increase in the amount of insulating material used and in the wiring space, which will in turn result in the increased cost and make it more difficult to decrease the weight of the wires.

The wiring in an automobile requires the use of a great number of terminals. This poses such problems as electrical corrosion at the terminals and deterioration of solderability.

On the other hand, the wire conductors disclosed in the abovementioned publications show an increased strength due to the addition of tin to copper, which in turn makes it possible to reduce the sectional area of the conductor twisted together. But even with these wires the minimum value of the sectional area is 0.15-0.3 mm$^2$. If lowered to the currently required level of 0.05-0.15 mm$^2$, the strength will be insufficient. Even if strength is sufficient, the electrical resistance will be too large because the conductivity will be less than 20 percent IACS.

Further, though the conductor wires having a tensile strength of 90-140 kgf/mm$^2$ and a load at break of 6 kgf or more have a satisfactory static strength, they are liable to break when subjected to impact tension during manufacture or mounting on a vehicle.

It is an object of the present invention to provide an electric wire conductor for use in an automobile which is lighter in weight and reliable.

The wire conductor according to this invention is made by twisting a plurality of element conductors having the following structure and composition after thermal treatment such as tempering or annealing so that their tensile strength will be 80-160 kgf/mm$^2$ and the elongation at break E be 2% or more. The conductor after twisting has a sectional area D of 0.05-0.3 mm$^2$, a load at break T of 6 kgf or more and an elongation at break E of 2% or more.

The element wires used are composite wires having a conductivity of 25% IACS or more and having a surface layer made of copper or its alloy and a steel core containing 0.15-0.85% of carbon, one or more of the elements selected from the group consisting of Si, Mn, Ni, Cr, Mo, Nb, V, B, Be, Al and Ti in the amount of 0.05-0.3% Si, 0.3-1.9% Mn, 0.5-5.0% Ni, 0.2-2.0% Cr, 0.1-1.0% Mo, 0.01-0.2% Nb, 0.01-1.0% V, 0.001-0.006% B, 0.1-1.0% Be, 0.02-1.0% Al, 0.02-1.0% Ti, a total of 0.05% or less of P and S as unavoidable impurities, and 0.3% or less of copper. Percent is all by weight. Carbon is added to the element wires to improve annealing properties and to increase the mechanical strength, Si, Mn and Al for deoxidation and to improve the annealing properties, Ni, Cr, B, Be and Mo to improve annealing properties and to prevent embrittlement due to tempering, and Nb, V and Ti to increase deposition.

The composite element wires may be subjected to heat treatment after wire drawing and twisting. Also, they may be drawn after heat treatment or annealing to the extent that the t, T and E values clear required levels.

The term heat treatment herein used refers to ordinary hardening or tempering or a continuous cooling transformation treatment such as austempering or martempering (FIG. 3).

FIG. 1 shows the section of the wire conductor according to this invention in which the conductor 1 is made by twisting seven strands 2 each having a diameter d. In this figure, numeral 3 designates a steel wire as a core of each strand 2. A surface layer 4 is of oxygen-free copper covering the core 3.

Supposing that the sectional area of the conductor is the same, it is desirable to use as many strands as possible to assure a good flexibility of the conductor. But it is troublesome to set a large number of fine strands on a twisting machine. Thus, the number of strands used should be 2-37, preferably 7-19.

The content of oxygen-free copper or copper alloy put on the outer periphery of the core of the strand should be 20-80 percent by weight.

The conductivity of the strand should not exceed 80 percent IACS.

By using a composite material having a covering of copper (or its alloy) as an element conductor or strand, the conductivity required (25 percent IACS or more) and good solderability are achieved by the covering.

Also, since a steel wire containing 0.20-0.75 percent of carbon is used as the core, the conductor has a higher tensile breaking load T, a higher terminal housing retainability and a higher flexibility than conventional conductors. This makes it possible to reduce the sectional area and the weight of the conductor after twisting.

According to this invention, the tensile strength t of each strand should be within 80-160 kg/mm$^2$. This is because if less than 80 kg/mm$^2$, the load at break of the conductor will be 6 kg or less, if the conductor is made up of seven strands and the total sectional area D is 0.1 mm$^2$. Such a wire will be more liable to breakage and cannot retain a terminal with a sufficient force. On the other hand, if more than 160 kgf/mm², it is impossible to achieve a 2% elongation E because the wire is as drawn. Considering the terminal retaining force, the tensile strength t should be preferably 90–140 kg/mm².

The elongation E at break of each strand or the twisted wire should be 2% or more. If less than 2%, the wire is liable to breakage due to impact tension during manufacture (when connecting to terminals or covering with vinyl) or when mounted on a car. The preferred E value should preferably be 3% or more.

The conductivity of each strand should be 25 percent IACS or more. This value was obtained by calculating the permissible current from the electrical resistance of the conductor composed of strands having their surface layer of oxygen-free copper or copper alloy. Supposing that the lowest permissible current is 1 ampere, the conductivity should be 25 percent or more, preferably 30–40 percent IACS or more. In order to maintain the required tensile strength by use of the composite material, the conductivity should not exceed 80 percent IACS. If larger than that, the tensile strength will be sacrificed.

The total sectional area D of the conductor after twisting should be 0.05–0.30 mm². If more than 0.30 mm², the required strength can be obtained even with a conventional conductor, but it is impossible to achieve decrease in weight. On the other hand, if less than 0.05 mm², the conductor will be liable to deform by tensile force provided the conductor has a T value of 5 kg or less and is composed of seven strands having a diameter of 0.08 mm. More preferably, the D value should be 0.07–0.20 mm².

With a conventional annealed copper wire, the lower limit of the total sectional area D is 0.5 mm² in view of its mechanical properties. In case of a copper wire containing tin (0.3–0.9 percent), the lower limit of the D value is ordinarily 0.2 mm². In contrast, according to the present invention, even if the D value is around 0.1 mm², the strength equivalent to that of a conventional wire having a D value of 0.3 mm² can be expected. This will permit a considerable reduction in weight of the conductor (for example, if D is 0.1 mm², the weight will be 60 percent less than the 0.3 mm² structure.

The content of carbon in the steel wire as the core of each strand should be 0.15–0.85 percent. If less than 0.15%, it is difficult to achieve both a tensile strength t of 60 kgf/mm² or more and an elongation E of 2% or more, for any copper content. If more than 0.85%, the steel wire will be too hard to achieve sufficiently high tensile strength t and elongation e simultaneously and be difficult to thin.

One or more of the following elements should be added. Each of the elements should have the following content for the reasons set forth below.

Si: It should be 0.05% to 0.3%. If less than 0.05%, the effect of deoxidation will be insufficient. This leads to increase oxide content in the steel and poor elongation, poor hardening properties and insufficient strength. If more than 0.3%, the wire will be embrittled so much that the elongation will be lower than 2%. Also, due to embrittlement, the elongation properties will be poor.

Mn: It should be 0.3% to 1.9%. If less than 0.3%, the effect of deoxidation and hardening property will be insufficient for the same reasons as for Si. Also, the improvement in the corrosion resistance, which is one of the secondary effects, cannot be expected so much. If more than 1.9%, the elongation will be insufficient and the elongation properties will worsen as in the case of Si.

Ni: It should be 0.5 to 5.0%. If less than 0.5%, no improvement in the hardening properties can be expected. The improvement in corrosion resistance will not be expected. If more than 5%, the hardening properties will not be so high as to justify the increase in cost.

Cr: It should be 0.2 to 2.0%. If less than 0.2%, the hardening properties will not be satisfactory and the strength of the wire will not be sufficient. The corrosion resistance will be bad, too. If more than 2.0%, the strength and elongation properties will not improve so much as to justify the increase in cost for heat treatment.

B: It should be 0.001 to 0.006%. If less than 0.001, the hardening properties as well as strength will not improve. If more than 0.006%, the elongation will be poor due to embrittlement. This will make the thinning of wire difficult.

Be: It should be 0.1 to 1.0%. If less than 0.1%, the hardening properties will not improve. If more than 1.0%, the wire will be embrittled.

Mo: It should be 0.1 to 1%. If less than 0.1%, the hardening properties will not be good and embrittlement due to tempering cannot be prevented effectively. If more than 1%, the temperature for the steel to be transformed into austenite (Ms temperature) will rise excessively. This will increase the time for transformation so as not to justify the increased cost as compared with the effect achieved.

Nb: It should be 0.01% to 0.2%. If less than 0.01%, it is difficult to harden the wire by the deposition of carbides or to reduce the crystal grain size. If more than 0.2%, the wire will be hardened excessively by the deposition of carbides. This will incur cost increase as in case of Mo.

V: It should be 0.01% to 1.0%. If not, there will be the same problems as with Nb.

Ti: It should be 0.02% to 1.0%. If less than 0.02%, the effect of improving hardening properties will be insufficient. If more than 1.0%, the hardening properties will worsen. This may make it difficult to obtain a thin wire by drawing.

Al: It should be 0.02 to 1.0%. If less than 0.02%, the effect of deoxidation when dissolved will be insufficient. If more than 1.0%, oxides such as $Al_2O_3$ will develop, causing such trouble as wire breakage during wire drawing.

P and S: These elements should be contained as impurities after dissolution in the amount of 0.05% or less.

Cu: This element improves corrosion resistance if contained in trace amounts. But if more than 0.3%, the wire may develop cracks during hot processing or it may crack or be broken during drawing for thinning after heat treatment.

According to this invention, the weight of the electric wire conductor can be reduced remarkably while keeping the mechanical properties such as terminal housing retaining force, tensile breaking load and flexing resistance, electrical properties and solderability at satisfactory levels. This prevents increases in the weight of wires and space for wiring with increase in the wiring points, thereby reducing the amount of insulating material used and thus the cost.

Further, as is well known, by the addition of Cr, Mn, Ni or Cu, the corrosion resistance of the core can be improved effectively.

Other features and objects of the present invention will become apparent from the following description taken with reference to the accompanying drawings, in which.

Figure 1:
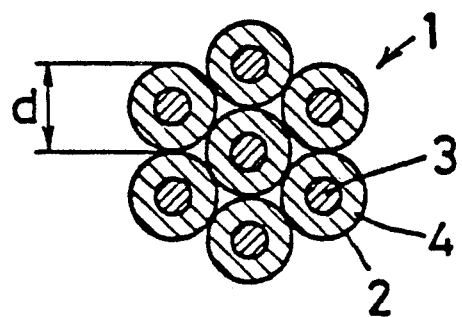
FIG. 1 is a sectional view of a wire conductor embodying the present invention.

As core materials, different kinds of steel rods having a diameter of 8.0 mm and different contents of carbon and other elements as shown in Table 1 were prepared. As the covering copper tubes, tubes made of oxygen-free copper (under JIS 3510) (hereinafter referred to as OFC tubes) were prepared. These covering copper tubes were straight tubes having an external diameter of 16 mm and an internal diameter of 12 mm.

Next, in order to make composite strands from these materials, the steel rods were inserted into the OFC tubes while dry-polishing (shot blast polishing) their surfaces. The resulting materials were drawn by a die to reduce the diameter to about 10 mm. The copper composite materials thus obtained showed a conductivity of about 30% for specimen No. 1, about 38–40% for specimen Nos. 2–9 and 11–16 and 30% specimen No. 10.

These materials were subjected to repeated drawings and softenings to reduce the diameter to 0.13 mm. As the final softening step, specimen Nos. 1, 3–8, 10, 13, 14 and 16 were subjected to water quenching starting from 890° C. and tempering at 200° C., specimen No. 2 was subjected to continuous cooling transformation treatment starting from 890° C., and specimen No. 9 was subjected to water quenching from 890° C., tempering at 400° C. and light wire drawing.

Specimen Nos. 11–17 were prepared for comparison purposes, of which specimen No. 11 was drawn to a high degree and its elongation at break was less than 2%.

No. 12 contained carbon in the amount not within the range defined by the present invention. It was drawn to a high degree and its elongation at break was less than 2%.

No. 13 also contained carbon in the amount not within the range defined by the present invention. Its tensile strength was less than 160 kgf/mm² even after subjecting it to final heat treatment.

No. 14 contained carbon in the amount within the range defined in the present invention but the contents of other additives were not within the range defined by the present invention. Thus, its tensile strength was less than 60 kgf/mm².

In No. 15, the content of carbon and the contents of Si, Mn, Cr, Nb, Ni and V were all within the range defined in the present invention. But the degree of drawing was high. Its elongation at break was less than 2%.

In No. 16, the content of carbon was within the range defined by the present invention but those of Si, Mn, Cr, Nb, Ni, Al and Mo were not. Thus, wire breakage happened frequently during wire drawing and while assembling a harness due to the existence of oxides (inclusions) in the core.

The tensile strength t and conductivity of the thus obtained strands are shown in Table 1.

Thereafter, seven strands of each specimen were twisted together to form wire conductors having a total sectional area D of 0.08–0.1 mm². They were then covered with vinyl chloride to a thickness of 0.2 mm for use as electric wires in automobiles.

Various characteristics of these wire conductors are shown in Table 4 together with those of conventional and comparative conductors.

For electric wires for automobiles, the terminal housing retaining force is an important property for high reliability of the connecting portions to terminals. To evaluate this property, after connecting each conductor to a terminal by compressed bonding, it was pulled by a tension tester to measure the load when it comes out of the connecting portion (or when it is broken). Such retaining force should be 7 kg or more, preferably 10 kg or more.

Also, the tensile breaking load should preferably be about 10 kg or more as far as the elongation of the conductor is 3% or more.

Figure 2:
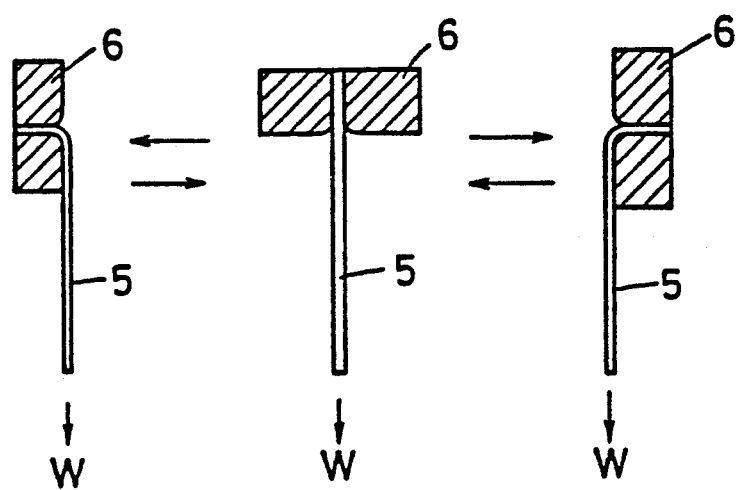
FIG. 2 is a view for explaining how the flexing test was done.
Figure 3:
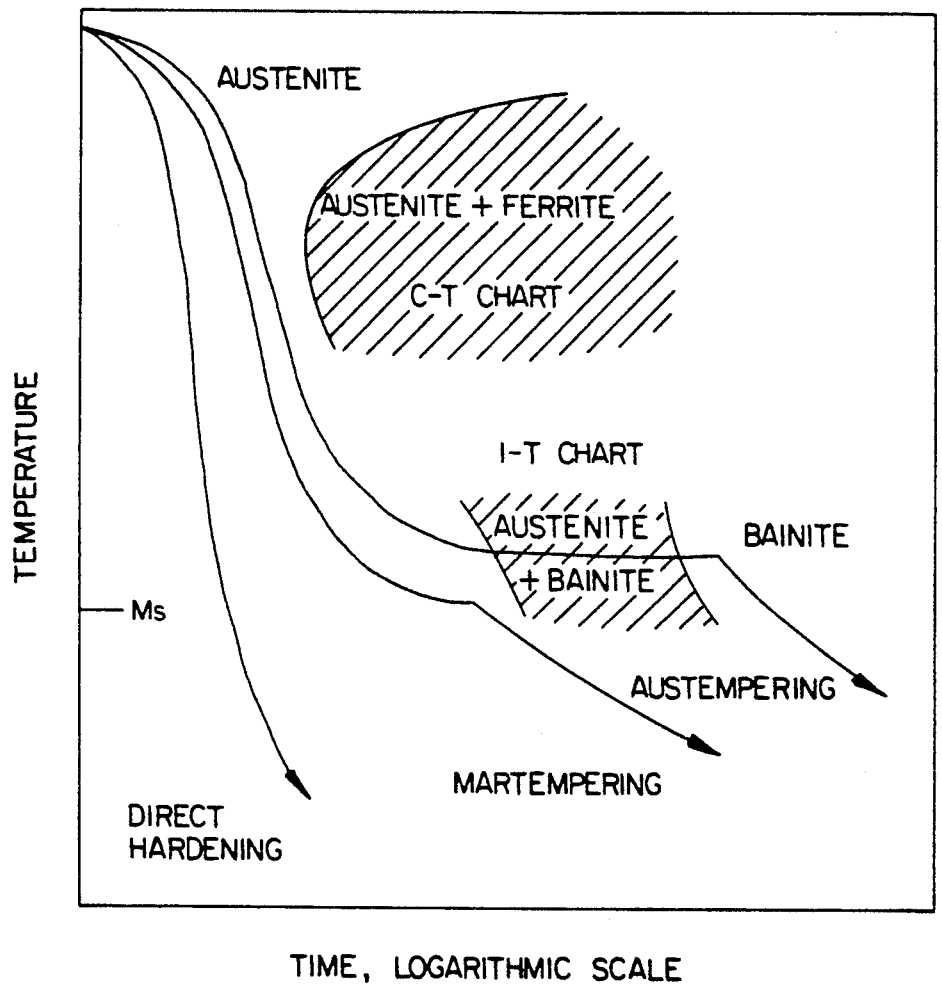
FIG. 3 is a graph showing the relation between the heat treatment and the Ms temperature.

Also, the electric wire should have a flexing resistance high enough not to get broken when bent repeatedly near the terminal. To measure the flexing resistance, an electric wire 5 having a covering was held by a jig 6 shown in FIG. 2 and bent right and left by an angle of 90 degrees in each direction with the load W of 500 g put on one end thereof. The flexing resistance was given in terms of the number of reciprocating motions of the wire done without being broken.

As for the solderability, after immersing the specimens in white rosin flux, they were immersed in eutectic solder kept at 230° C. for 2 seconds and the area ratio of the surface wet with molten solder to the entire immersed surface area was measured. A good mark was given for 90% or more and a bad mark was given for less than 90 %.

As is apparent from the data in the Tables, comparing the electric wires according to the present invention with the conventional wires, the conductors having a total sectional area of 0.3 mm² (specimen No. 19) weigh 4.5 g/m whereas the conductors having a total sectional area of 0.1 mm² (specimen Nos. 1–4) weigh 1.4–1.5 g/m. In other words, the weight reduced by about 3.0 g/m or 70 percent. As for the strength, the wires according to the present invention were substantially the same as the conventional wires.

TABLE 1

| Specimen No. | Material for conductor | Composition of core (wt %) | | | | | | | | | | | | |
|---|---|---|---|---|---|---|---|---|---|---|---|---|---|---|
| | | C | Si | Mn | P | S | Cu | Cr | B | Al | Nb | Ni | Mo | V |
| Present invention | | | | | | | | | | | | | | |
| 1 | OFC-clad 0.3% C steel (hardened and tempered) | 0.3 | 0.27 | 1.86 | 0.015 | 0.008 | 0.01 | 0.91 | 0.002 | — | — | — | — | — |
| 2 | OFC-clad 0.3% C steel (continuous cooled, transformed) | " | " | " | " | " | " | " | " | — | — | — | — | — |
| 3 | OFC-clad 0.4% C steel (hardened and tempered) | 0.45 | 0.22 | 0.7 | 0.013 | 0.009 | — | 1.05 | — | — | — | — | — | — |
| 4 | OFC-clad 0.25% C steel | 0.23 | " | 0.7 | " | " | 0.01 | 0.98 | — | — | — | — | 0.40 | — |

TABLE 1-continued

| Specimen No. | Material for conductor | Composition of core (wt %) | | | | | | | | | | | | |
|---|---|---|---|---|---|---|---|---|---|---|---|---|---|---|
| | | C | Si | Mn | P | S | Cu | Cr | B | Al | Nb | Ni | Mo | V |
| 5 | OFC-clad 0.3% C steel (hardened and tempered) | 0.3 | " | 0.5 | " | " | — | 0.90 | — | — | — | 2.7 | — | — |
| 6 | OFC-clad 0.4% C steel (hardened and tempered) | 0.45 | 0.22 | 0.8 | " | " | — | 0.91 | — | — | — | 1.8 | 0.18 | — |
| 7 | OFC-clad 0.2% C steel (hardened and tempered) | 0.22 | 0.21 | 0.8 | 0.015 | 0.008 | 0.01 | 0.91 | 0.003 | — | — | 0.8 | 0.50 | 0.07 |
| 8 | OFC-clad 0.42% C steel (hardened and tempered) | 0.44 | 0.21 | 0.62 | 0.016 | 0.015 | 0.02 | — | — | — | — | — | — | — |
| 9 | OFC-clad 0.25% C steel (15% drawn after hardened and tempered) | 0.25 | 0.26 | 1.20 | 0.012 | 0.01 | 0.01 | — | — | 0.03 | 0.07 | — | — | — |
| 10 | OFC-clad 0.6% C steel (hardened and tempered) | 0.6 | 0.21 | 0.47 | 0.012 | 0.004 | 0.005 | — | — | — | — | — | — | — |
| Comparative example | | | | | | | | | | | | | | |
| 11 | OFC-clad 0.42% C steel (drawn) | 0.44 | 0.21 | 0.62 | 0.016 | 0.015 | 0.02 | — | — | — | — | — | — | — |
| 12 | OFC-clad 0.1% C steel (drawn) | 0.12 | 0.25 | 0.9 | 0.015 | 0.009 | 0.02 | — | — | — | — | — | — | — |
| 13 | OFC-clad 0.1% C steel (hardened and tempered) | 0.12 | 0.25 | 1.3 | 0.015 | 0.015 | 0.02 | 0.91 | 0.002 | — | — | — | 0.50 | — |
| 14 | OFC-clad 0.20% C steel (hardened and tempered) | 0.24 | 0.03 | 0.1 | 0.015 | 0.015 | 0.02 | 0.11 | — | 0.01 | — | 0.2 | 0.05 | — |
| 15 | OFC-clad 0.2% C steel (drawn) | 0.24 | 0.28 | 1.85 | 0.013 | 0.008 | 0.01 | 1.01 | — | — | 0.1 | 0.8 | — | 0.09 |
| 16 | OFC-clad 0.42% C steel (hardened and tempered) | 0.44 | 0.03 | 0.2 | 0.04 | 0.02 | 0.02 | 0.10 | — | 0.01 | — | — | 0.05 | — |
| 17 | Aluminium (drawn) | — | | | | | | | | | | | | |
| Prior art | | | | | | | | | | | | | | |
| 18 | Tough pitch soft copper | — | | | | | | | | | | | | |
| 19 | CU-0.62% Sn alloy | — | | | | | | | | | | | | |

TABLE 2

| Specimen No. | Conductor outer dia. (mm) | Structure of conductor | Element conductor's characteristics | | | Conductor weight (g/m) |
|---|---|---|---|---|---|---|
| | | | Conductivity (IACS %) | Tensile strength (kgf/mm$^2$) | Elongation (%) | |
| Present invention | | | | | | |
| 1 | 0.4 | 7/0.13φ | 30 | 120 | 7.5 | 0.84 |
| 2 | " | " | 38 | 110 | 8.0 | 0.85 |
| 3 | " | " | " | 120 | 5.0 | 0.85 |
| 4 | " | " | " | 108 | 8.0 | 0.85 |
| 5 | " | " | " | 109 | 7.5 | 0.85 |
| 6 | " | " | " | 115 | 7.5 | 0.85 |
| 7 | " | " | " | 108 | 8.5 | 0.85 |
| 8 | " | " | 40 | 115 | 5.5 | 0.85 |
| 9 | " | " | 40 | 110 | 45 | 0.85 |
| 10 | " | " | 60 | 108 | 4.8 | 0.86 |
| Comparative example | | | | | | |
| 11 | " | " | 40 | 120 | 1.0 | 0.85 |
| 12 | " | " | 40 | 90 | 0.8 | 0.85 |
| 13 | " | " | 40 | 53 | 10 | 0.85 |
| 14 | " | " | 40 | 55 | 10 | 0.85 |
| 15 | " | " | 38 | 125 | 0.8 | 0.85 |
| 16 | " | " | 40 | 85 | 3.3 | 0.85 |
| 17 | 0.96 | 7/0.32φ | 63 | 23 | 2.5 | 1.5 |
| Prior art | | | | | | |
| 18 | 0.78 | 7/0.26φ | 100 | 28 | 20 | 3.4 |
| 19 | 0.6 | 7/0.2φ | 60 | 55 | 18 | 2.0 |

| Specimen No. | Wire weight after covering (g/m) | Conductor tensile break load (kgf) | Terminal housing holding force (kgf) | Flexing resistance (number of times) | Solderability | Wire broken when assembling harness? |
|---|---|---|---|---|---|---|
| Present invention | | | | | | |
| 1 | 1.4 | 11.5 | 10.8 | 8850 | Good | No |
| 2 | 1.4 | 11.0 | 10.4 | 8860 | " | " |
| 3 | " | 11.3 | 10.9 | 8250 | " | " |
| 4 | " | 10.5 | 10.0 | 8440 | " | " |
| 5 | " | 10.6 | 10.1 | 8350 | " | " |
| 6 | " | 11.0 | 10.6 | 8710 | " | " |
| 7 | " | 10.9 | 10.2 | 8050 | " | " |
| 8 | " | 11.0 | 10.6 | 8700 | " | " |

TABLE 2-continued

| | | | | | | |
|---|---|---|---|---|---|---|
| 9 | " | 11.0 | 10.6 | 7750 | " | " |
| 10 | " | 10.7 | 10.0 | 6800 | " | " |
| Comparative example | | | | | | |
| 11 | " | 11.5 | 10.9 | 2150 | " | Yes |
| 12 | " | 8.6 | 8.2 | 1030 | " | Yes |
| 13 | " | 5.0 | 4.3 | 2800 | " | Yes |
| 14 | " | 5.1 | 4.5 | 2050 | " | Yes |
| 15 | " | 11.9 | 11.0 | 1050 | " | Yes |
| 16 | " | 8.1 | 7.1 | 610 | " | Yes, while drawing |
| 17 | 5.0 | 4.2 | 4.0 | 3000 | Bad | Yes |
| Prior art | | | | | | |
| 18 | 5.0 | 10.6 | 10.0 | 7200 | Good | No |
| 19 | 4.5 | 11.9 | 11.0 | 7700 | Good | No |

What is claimed is:

1. An electric wire conductor for use in automobiles made by twisting together a plurality of strands, said each strand before twisted having a tensile strength of 80-160 kgf/mm$^2$ and a conductivity of 25% IACS or more, said conductor having a total sectional area of 0.05-0.30 mm$^2$, a breaking load of more than 6 kgf, and an elongation at break not less than 2%, each of said strands comprising a surface layer made of copper or copper alloy and a core made of steel containing 0.15-0.85 percent of carbon, and at least one element selected from the group consisting of 0.05-0.3% Si, 0.3-1.9% Mn, 0.5-5.0% Ni, 0.2-2.0% Cr, 0.1-1.0% Mo, 0.01-0.2% Nb, 0.01-1.0% V, 0.001-0.006% B, 0.1-1.0% Be, 0.02-1.0% Al, 0.02-1.0% Ti, in the contents indicated above, a total of 0.05% or less of P and S as unavoidable impurities, and 0.3% or less of Cu.

2. An electric wire conductor as claimed in claim 1 wherein said surface layer of said strand is made of oxygen-free copper or copper alloy in the amount of 20-80 percent by weight.

3. An electric wire conductor as claimed in claim 1, wherein the conductivity of said each strand is not more than 80 percent IACS.

4. An electric wire conductor as claimed in claim 2, wherein the conductivity of said each strand is not more than 80 percent IACS.

* * * * *